United States Patent [19]

Martin

[11] 3,747,895
[45] July 24, 1973

[54] SPRING EXTENDER
[76] Inventor: Marcus Martin, 1570 E. Hurd St., Monroe, Mich. 48167
[22] Filed: Nov. 4, 1971
[21] Appl. No.: 195,555

[52] U.S. Cl. .................................. 254/10.5, 29/227
[51] Int. Cl. ......................................... B25b 27/00
[58] Field of Search ........................... 29/227, 237; 254/10.5, 67

[56] References Cited
UNITED STATES PATENTS
2,883,742  4/1959  Prath ............................... 254/10.5
2,885,769  5/1959  Brown .............................. 254/10.5
3,555,590  1/1971  Halopoff ........................... 29/227 X Primary Examiner—Robert C. Riordon
Assistant Examiner—J. C. Peters
Attorney—William P. Hickey

[57] ABSTRACT

An inexpensive spring extender comprising: a pair of arms one of which has thread engagement with a lead screw and the other of which is swivelled to the lead screw between opposing abutments. The arms are adapted to engage opposite ends of a coil spring, and the lead screw when actuated extends the spring.

5 Claims, 6 Drawing Figures

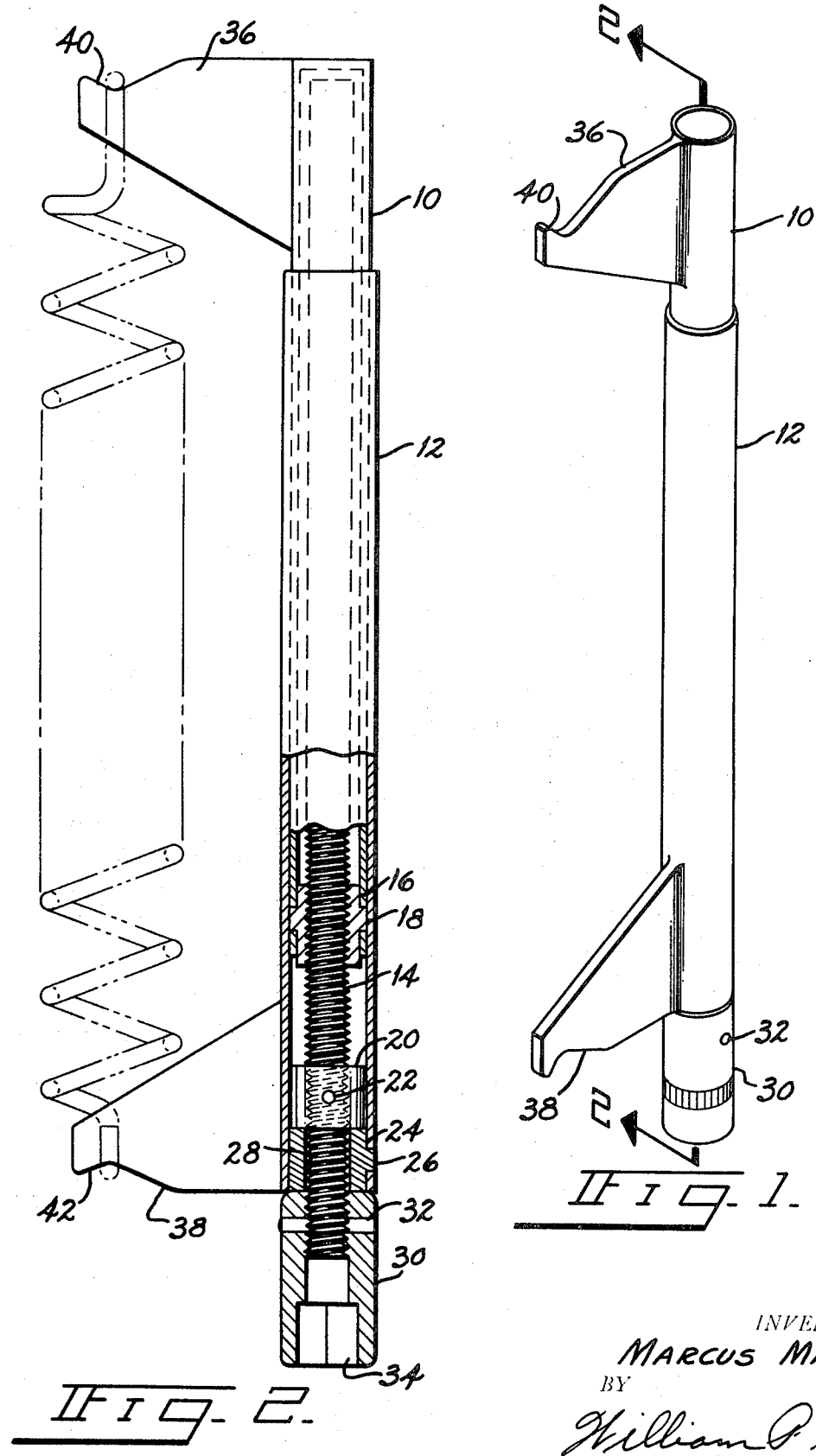

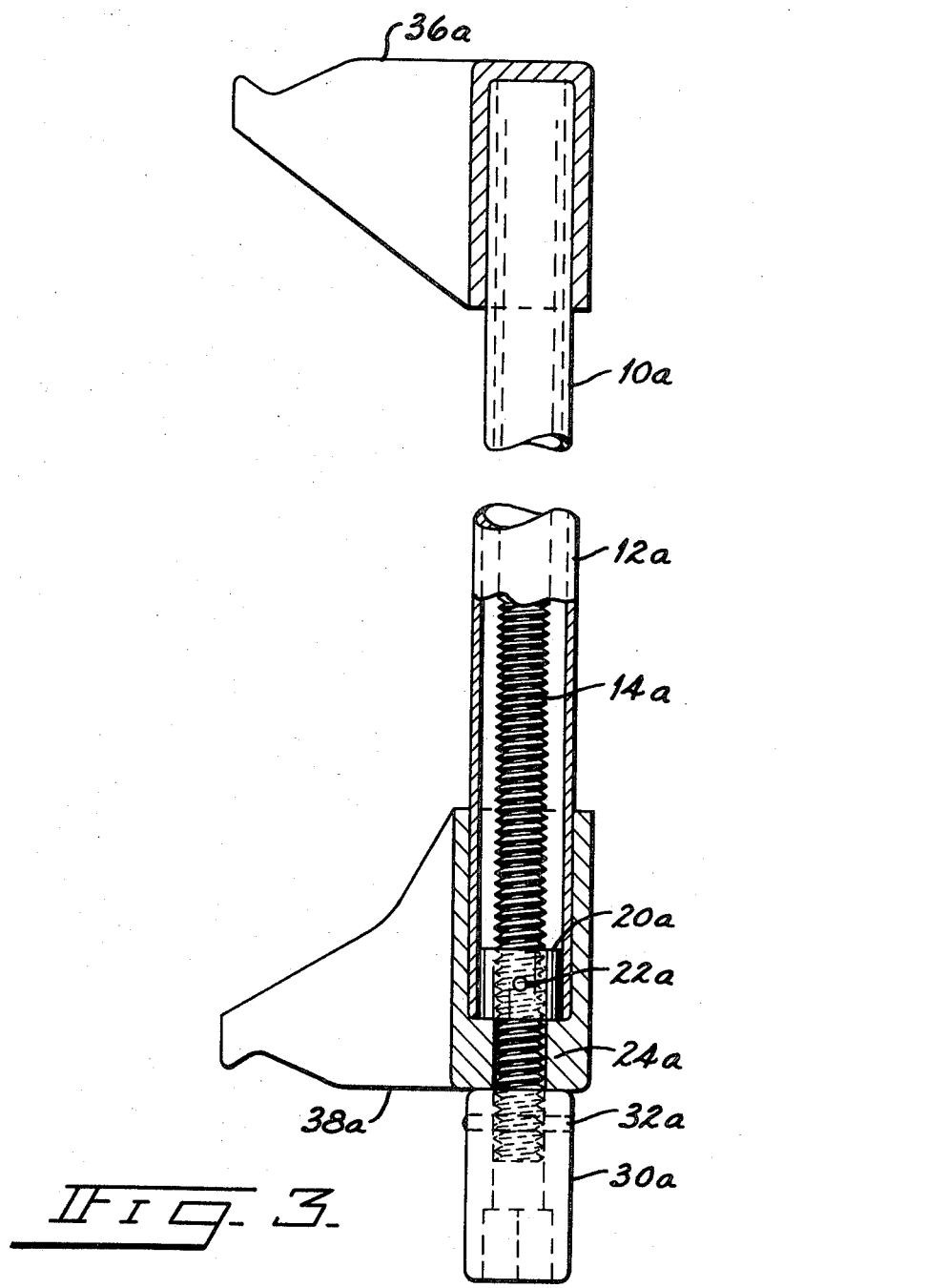

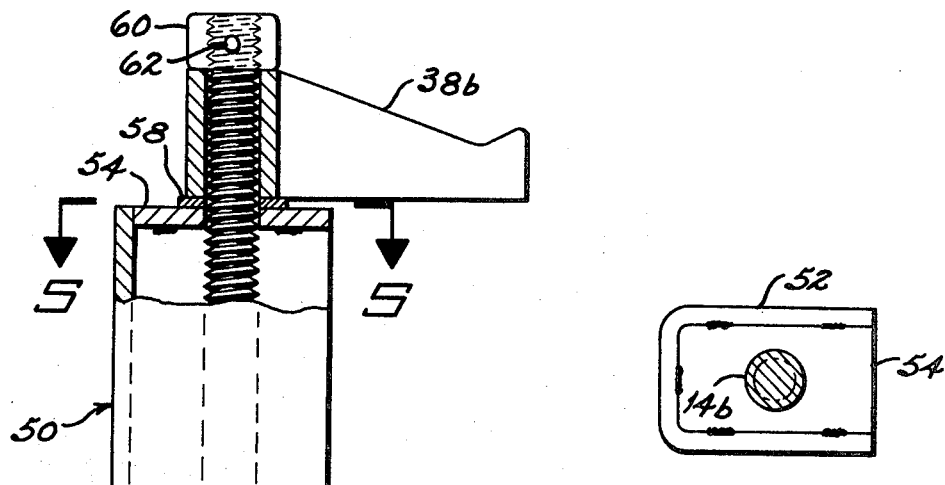
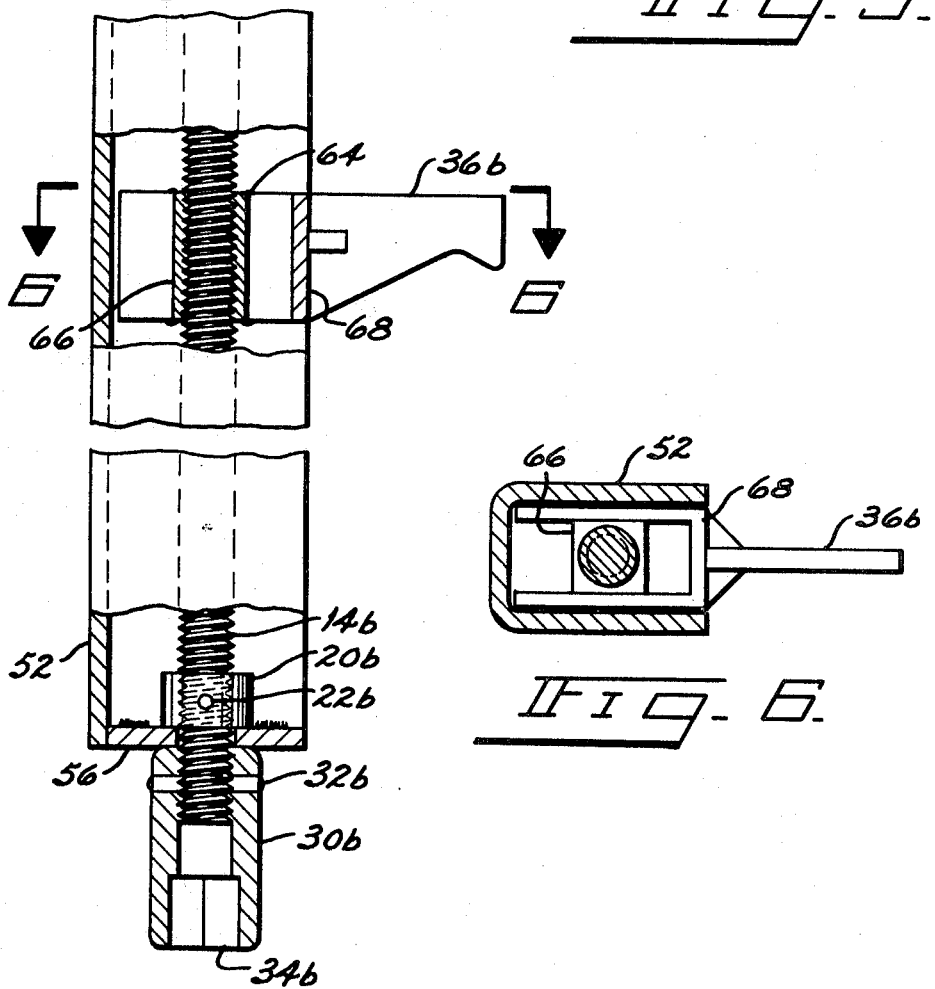

SPRING EXTENDER

BACKGROUND OF THE INVENTION

The springs which are used to counterbalance the hoods of automotive vehicles are relatively short and powerful, and are difficult to remove and/or install by an automotive mechanic in the field. The practice of many mechanics replacing the springs is to clamp one end of the spring between vice grips, brace themselves against the fire wall of the vehicle while seated on a fender, and pull outwardly to stretch the spring off of the spring retainer on the hood. If the mechanic's hands slip off of the vice grip, or the vice grip slips off of the spring during the operation, the mechanic may be thrown violently forward against adjacent structure, or onto the floor. The anchorages for the opposite ends of the spring may be parallel in some automobiles, and may be rotated at any angle relative to each other in other vehicles. The springs are usually adajcent hinge mechanisms, and have support structure at its opposite end, so that in line mechanisms cannot be used. The incidence of spring removal and/or replacement is sufficiently small that most mechanics are not inclined to spend more than a few hours pay for special tooling to remove the springs.

An object of the present invention is the provision of a new and improved spring extender which is simple in design, rugged in construction, and inexpensive to manufacture, and which can be used to extend springs no matter how their anchorage points are rotated relative to each other.

A further object of the present invention is the provision of a new and improved spring extender of the above described type which is made from a pair of telescoping tubes, a centrally located threaded rod, and four inexpensive collars appropriately secured to the respective members.

Further objects and advantages of the invention will become apparent to those skilled in the art to which the invention relates from the following description of the preferred embodiments described with reference to the accompanying drawings forming a part of this specification.

BRIEF DESCRIPTION OF THE DRAWINGS

FIG. 1 of the drawings is an isometric view of a spring extender embodying principles of the present invention;

FIG. 2 is a side view with portions broken away and showing a coiled spring being appropriately extended;

FIG. 3 is a fragmentary longitudinal section view through another embodiment of the invention;

FIG. 4 is a side view with portions broken away of still another embodiment of the invention;

FIG. 5 is a sectional view taken approximately on the line 5—5 of FIG. 4; and

FIG. 6 is a sectional view taken approximately on the line 6—6 of FIG. 4.

DESCRIPTION OF THE PREFERRED EMBDODIMENTS

The principal parts of the spring extender of the present invention are stock items, made primarily for other usages, and further incorporates a minimum of specially machined parts. Even the specially machined parts require a minimum of machining and can be made either on an automatic screw machine, or a production tapping machine.

The spring extender shown in FIGS. 1 through 3 of the drawing comprises inner and outer telescoping steel tubes 10 and 12 respectively, and a centrally located threaded rod 14. The inner tube 10 projects from one end of the outer tube 12, and the threaded rod 14 projects from the other end of the outer tube 12. The inner end of the inner tube 10 is provided with a threaded collar 16, which is spot welded as at 18 to the inner tube 10, and which is threaded onto the rod 14. A threaded collar 20 having clearance with the inside surface of the outer tube 12 is threaded onto the threaded rod 14 and pinned thereto as at 22. The collar 20, therefore, is rotated by the threaded rod 14. A third collar 24 is fixed, as by the spot weld 26, to the tube 12 on the opposite side of the collar 20 from the collar 18 to provide an annular bearing surface for the second collar 20. The third collar 24 has a cylindrical opening 28 that is slightly larger than the threaded rod 14, so that clearance exists with respect thereto. A fourth threaded collar 30 is threaded onto the projecting end of the rod 14, and is fixed thereto as by a cross pin 32. The collar 30 is provided with some type of abutment surface by which torque can be applied to the threaded rod 14, as for example a crank, polygonal outer surface, etc. The collar 30 shown in the drawing, is provided with an opening 34 that is square so as to receive the driving head of the usual socket wrench.

Respective members of a pair of spring abutments or extender arms 36 and 38 are provided on the inner and outer tubes respectively. These abutments are conveniently provided by flat sections of plate extending longitudinally of the tubular members and brazed or welded thereto. The outer ends of the abutments 36 and 38 are notched as at 40 and 42, respectively, to prevent the spring from slipping off of the abutments while being extended. The adjacent edges of the abutments are tapered to provide a strong moment resistant attachment to the tubes, and a narrow outer edge capable of slipping between coils of the spring.

In some instances, the abutments 36 and 38 can be made part of cast end caps which surround corresponding end portions of the tubes 10 and 12 respectively; and in this case, the collar 24 can be made an integral part of the cap which includes the abutment 38. This construction is shown in FIG. 3 of the drawings. Those portions of the embodiment shown in FIG. 3 which are similar to corresponding portions of the embodiment shown in FIGS. 1 and 2, are designted by a like reference numeral characterized further in that a suffix "a" is affixed thereto. In the embodiment shown in FIG. 3, the cocking action of the cast spring abutment 38a will normally pull the tube 12a along with the spring abutment 38a, and provide telescoping movement relaive to the tube 10a. In some instances, however, it may be desired to tack weld or otherwise affix the spring abutment 38a to the tube 12a.

It will be seen that the collars 16, 20 and 24 can be made on an automatic screw machine and quickly and easily tack welded in place. The collar 30 may likewise be made on an automatic screw machine, but can also be made as a casting to inexpensively provide the square opening 34. The casting is suitably drilled and tapped to receive the rod 14. In the embodiment shown in FIG. 3, the collar 24a is made integrally with the cast spring abutment 38a, and no further machining is required. The assembly is completed by threading and spacing the collars 20, 24 and 32 on the rod 14, cross drilling the collars 20 and 30, and installing the cross pins 22 and 32 therein. Where the separate collar 24 shown in FIGS. 1 and 2 is provided, the collar 24 may be tack welded or otherwise suitably affixed to the end of the tube 12.

It will be seen that the tubes 10 and 12 can be sections of standard size tubes, and the rod 14 can be a section of commercially available threaded rod. In the embodiment shown in the drawing, the tube 10 has a diameter of five-eighths inch, and the tube 12 has a diameter of three-fourths inch with a wall thickness of 0.030 inch.

The spring extneder of the invention is used by turning the collar 30 clockwise until the abutments have a spacing that is less than the length of the spring to be extended. The abutments 36 and 38 are then placed underneath the opposite end portions of the spring, and the collar 30 is rotated counterclockwise to produce separation of the collars 16 and 20 to thereby expand the spring and lift it from the abutments on which the spring is retained. It will be seen that the end abutment 36 can be rotated relative to the abutment 38 to coincide with spring abutments no matter what their angular position relative to each other. It will also be seen that the blade like abutments 36 and 38, or 36a and 38a, as the case may be, project a sufficient distance from the tubes 10 and 12 as to clear surrounding structure. The eccentric spring abutments causes a large moment to be exerted on the swivetal connection between the abutments, nevertheless, an inexpensive structure is provided which can withstand these large forces.

The embodiment shown in FIG. 4 generally comprises: a longitudinally extendig body 50 that is made from a section of U-shaped channel 52 having end walls 54 and 56 welded in place. The embodiment contains a lead screw, spring abutments or arms, and actuating mechanism therefor, and those portions of the embodiment shown in FIG. 4 which correspond with portions of the previously described embodiments are designated by a like reference numeral, characterized further in that a suffix b is affixed thereto. Collars 30b and 20b are positioned on opposite sides of the end wall 56 to prevent longitudinal movement of the lead screw 14b. The arm 38b is swivelled about the oppositely projecting end of the lead screw 14b from the end wall 54 and is locked against lateral movement between a bearing washer 58 and the wall 54. A collar 60 is threaded onto the end of the lead screw 14b and locked in place as by a pin 62.

The arm 38b, therefore, can rotate relative to the arm 36b, but is prevented from moving longitudinally of the lead screw 14b. The arm 36b has its inner end 64 positioned in the U-shaped channel 52 and has a sliding fit with respect to the side walls of the channel, so that the arm 36b is locked against rotation. The inner end 64 of the arm 36b is provided with a threaded collar 66 which has threaded engagement with the lead screw 14b. The collar 66 is made of bar stock with bar stock is fitted between opposite legs of a section of channel 68 and is tack welded thereto. Sides of the channel section 68 engage the sides of the channel 52 to provide a sliding guide therefor. The outer arm of the abutment or arm 36b is suitably welded to the channel 68.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. A spring extender comprising: inner and outer members constructed and arranged so that said inner member is guided for longitudinal movement by said outer member; a threaded rod extending longitudinally through said inner and outer members; a pair of lateral spring pick-up arms the first of which is mounted on said inner member and the second of which is secured to said outer member against longitudinal movement relative thereto; and four collars arranged in that order with the first collar being secured to said inner member and threaded on said rod, the second and fourth collars being secured to said threaded rod, and the third collar being nonrotatably secured to said outer member; said third collar being devoid of thread engagement with said rod, and said fourth collar having abutment surfaces for applying torque to said threaded rod.

2. The spring extender of claim 1 wherein said second pick-up arm is secured to said outer member by means constructed and arranged to both journal said pick-up arm for rotation about said outer member and prevent longitudinal movement relative thereto.

3. The spring extender of claim 2 wherein said outer member comprises a U-shaped channel member with an open side, said inner member fitting into and being guided by inwardly facing surfaces of the sidewalls of said U-shaped channel member, said threaded rod projecting through said outer member, and said second pick-up arm being journaled about the projection of said threaded rod, a fifth collar fixed to said projection of said threaded rod, and said second pick-up arm being confined between said fifth collar and the ned between said fifth collar and the end of said outer member.

4. A spring extender comprising: inner and outer telescoping tubes, said inner tube projecting from one end of said outer tube; a threaded rod in the center of said tubes; a pair of lateral spring pick-up arms one of which is mounted on said projecting end of said inner tube, and the other of which is mounted on said outer tube; and four collars arranged in that order with the first secured to said inner tube and threaded on said rod, the second and fourth being secured to said threaded rod, and the third being nonrotatably secured to said other pick-up arm; said third being devoid of threaded engagement with said rod, and said fourth collar having abutment surfaces for applying torque to said threaded rod.

5. The spring extender of claim 4 wherein said one of said pick-up arms is part of a cap fitting over said smaller tube, and said other pick-up arm and third collar are part of another cap fitting over the opposite end of said outer tube.

* * * * *